(12) United States Patent
Ebel et al.

(10) Patent No.: US 8,801,099 B2
(45) Date of Patent: Aug. 12, 2014

(54) SAFETY SEAT SUSPENDED ON A STRAP FRAMEWORK

(75) Inventors: Wolfram Ebel, Buren (DE); Andrè Haberecht, Hamburg (DE)

(73) Assignee: Autoflug GmbH, Rellingen (DE)

( * ) Notice: Subject to any disclaimer, the term of this patent is extended or adjusted under 35 U.S.C. 154(b) by 264 days.

(21) Appl. No.: 13/395,079

(22) PCT Filed: Sep. 3, 2010

(86) PCT No.: PCT/EP2010/005421
§ 371 (c)(1),
(2), (4) Date: Apr. 25, 2012

(87) PCT Pub. No.: WO2011/029555
PCT Pub. Date: Mar. 17, 2011

(65) Prior Publication Data
US 2012/0200136 A1    Aug. 9, 2012

(30) Foreign Application Priority Data
Sep. 8, 2009    (DE) .......................... 10 2009 040 472

(51) Int. Cl.
| | |
|---|---|
| *A47C 3/00* | (2006.01) |
| *B63B 29/06* | (2006.01) |
| *B60N 2/24* | (2006.01) |
| *B63B 29/04* | (2006.01) |
| *B60N 2/42* | (2006.01) |
| *B64D 11/06* | (2006.01) |

(52) U.S. Cl.
CPC .......... *B60N 2/24* (2013.01); *B64D 2011/0627* (2013.01); *B63B 29/06* (2013.01); *B63B 29/04* (2013.01); *B64D 11/06* (2013.01); *B60N 2/4242* (2013.01); *B64D 2011/0644* (2013.01)
USPC .......................................... 297/277; 297/278

(58) Field of Classification Search
CPC ...... B60N 2/4242; B60N 2/24; B60N 2/7011; B60N 2/30; B64D 25/06; B64D 11/696; A47B 43/006; B60P 7/087; F41H 7/046; B63B 2029/043
USPC .................................................. 297/277–280
See application file for complete search history.

(56) References Cited

U.S. PATENT DOCUMENTS

| | | | |
|---|---|---|---|
| 3,868,143 A | 2/1975 | Reilly | |
| 7,758,095 B2 * | 7/2010 | Elhanany | ........................ 296/63 |
| 7,775,479 B2 * | 8/2010 | Benthien | ................... 244/122 R |
| 2007/0170742 A1 | 7/2007 | Hansen | |

(Continued)

*Primary Examiner* — Sarah B McPartlin
(74) *Attorney, Agent, or Firm* — Jennifer S. Stachniak; Robert W. Becker

(57) ABSTRACT

Safety seat for land vehicles, aircraft and watercraft, including a strap framework for holding a sitting portion and comprising vertically extending support straps anchored to a vehicle and embodied as loops stretching between vehicle-mounted anchors above and below the sitting portion, which is secured to a support frame provided with two braces oriented in the direction of extension of the support straps. For securement of the support frame to the strap framework, a front strap or rear strap of each support strap loop is divided into two strap sections, one extending between the support frame and an anchor disposed above the sitting portion, and the other extending between the support frame and an anchor disposed below the sitting portion. Ends of the strap sections associated with the support frame are retained at the braces of the support frame and hold the support frame under tension in a vertical orientation.

12 Claims, 1 Drawing Sheet

(56) References Cited

U.S. PATENT DOCUMENTS

2008/0203805 A1* 8/2008 Hansen .................... 297/452.63
2010/0109393 A1 5/2010 Hansen
2010/0283298 A1 11/2010 Hansen

* cited by examiner

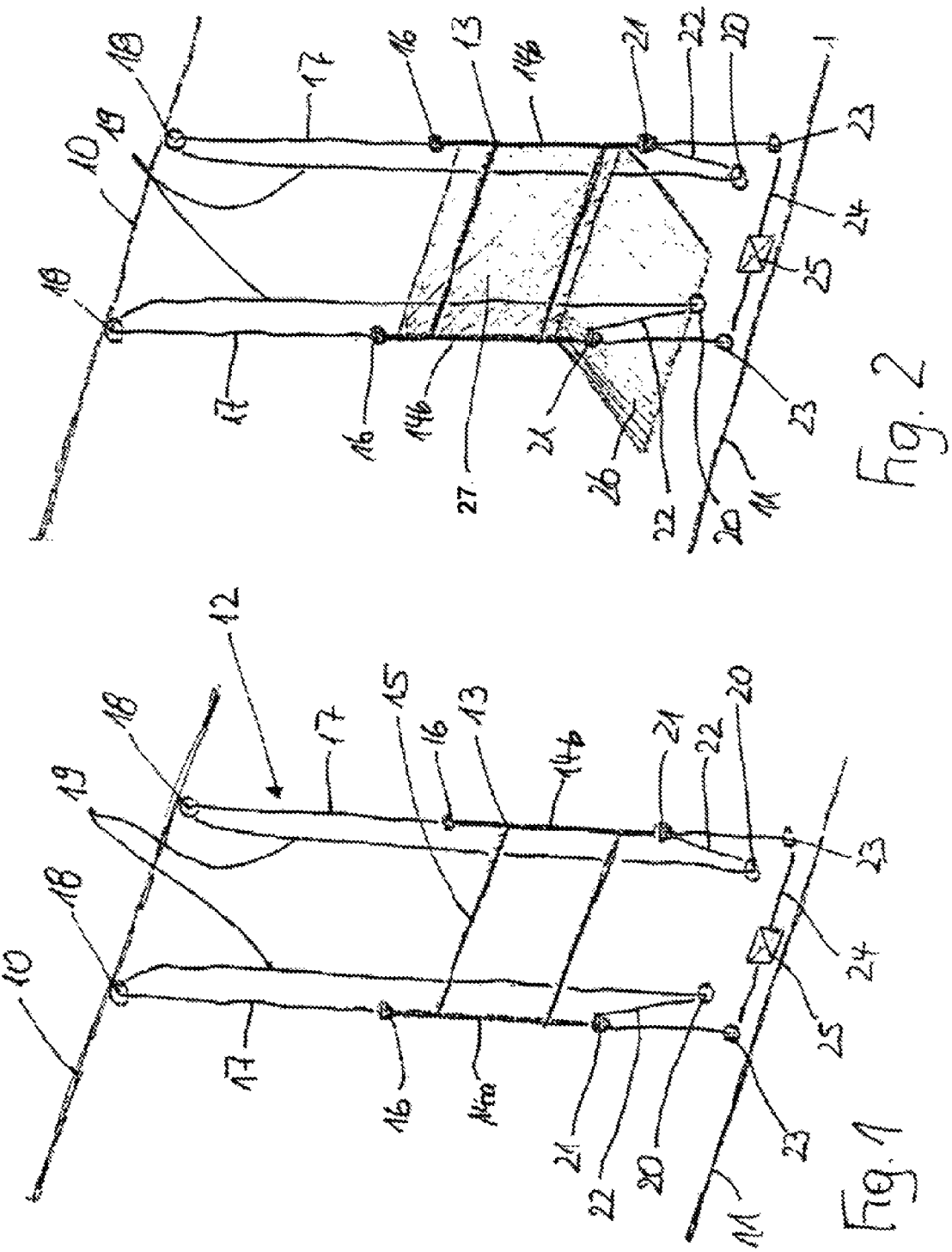

SAFETY SEAT SUSPENDED ON A STRAP FRAMEWORK

The instant application should be granted the priority dates of Sep. 8, 2009, the filing date of the corresponding German patent application 10 2009 040 472.4, as well as Sep. 3, 2010, the filing date of the International patent application PCT/EP2010/005421.

BACKGROUND OF THE INVENTION

The invention relates to a safety seat for land, air and sea vehicles, comprising a seat part which is fastened to a belt frame or strap framework having vertical retaining belts or straps that each extend in the vicinity of the rear seat-part edge and are fastened to the vehicle, wherein the retaining belts are designed as a belt loop stretched between vehicle-mounted anchors arranged at a vertical distance to each other above and below the seat part, the belt loop having a front belt and a rear belt thus formed.

A safety seat having the aforementioned features is described in DE 10 2007 019 348 B3. For the securement of the safety seat in a vehicle, two vertical support or retaining belt straps disposed next to one another in the width of the seat are stretched between two anchors that are arranged, for example, in the roof region and in the floor region of the vehicle. For this purpose, each retaining belt, which is embodied as a belt loop, has its two ends secured, for example, to the upper anchor and looped through the lower anchor, thus resulting in a doubled run of the retaining belt with a front belt that faces the seat part and a correspondingly extending rear belt. A transverse strut of the seat part of the safety seat engages into the intermediate space between front belt and rear belt, whereby the transverse strut is respectively secured in position in a stationary, closed fixed loop mounted on the rear belt. At the same time, the seat part is supported via supports that extend at an angle downwardly below the seat part, and that catch and are supported in respective further loops mounted on the rear belt. Due to the load of the seat part, with a person sitting thereon, the seat part equally applies via the supports a compressive force, and via its transverse strut a tensile force, upon the retaining belt, so that there consequently results a fixing of the seat part in position on the belt frame, which is placed under tension. The known safety seat has the drawback that affixing the plurality of loops on the retaining belts is expensive. Since the loops in addition are correspondingly highly loaded, correspondingly higher requirements are placed on their securement to the retaining belts. Also expensive is the configuration and design of the seat belt, with transverse struts and supports, in adaptation to the respectively provided retaining belt frame.

It is therefore an object of the present invention with a safety seat of the aforementioned general type to simplify its securement to the framework that is provided.

SUMMARY OF THE INVENTION

The basic concept to of the invention is that the seat part is fastened to a support frame having two braces oriented in the direction of extension of the vertical retaining belts, and that in order to fasten the support frame to the belt frame, the front belt or the rear belt of the respective loop-shaped retaining belts is divided into two retaining belt sections extending between the support frame and the anchor located above the seat part and extending between the support frame and the anchor located below the seat part, respectively, whereby the associated ends of the retaining belt sections are retained on the vertical braces of the support frame and retain the support frame under tension in the vertical orientation of the support frame.

The invention first of all has the advantage that the configuration of the seat part or sitting portion is simplified, in as much as the latter is secured to a support frame that is provided with two vertically oriented braces. Pursuant to the invention, the braces of the support frame are incorporated into the run of the strap framework, and are bound therein in such a way that with the securement of the safety seat in the vehicle, the need for any fixed connections between the vehicle structure and the safety seat is eliminated. The suspension of the safety seat is thus effected exclusively via textile materials, in other words materials that dampen shocks and vibrations, so that the transmission of shocks that act upon the vehicle, for example in the framework of a mine explosion, to the vehicle seat is reduced. With this incorporation of the vertical braces of the support frame into the run of the associated support strap, and the direct connection of the support straps to the ends of the braces of the support frame, the suspension of the safety seat on the otherwise textile strap framework is simplified.

Pursuant to one exemplary embodiment of the invention, the ends of the braces of the support frame are respectively provided with eyelets for the securement thereon of the ends of support straps and/or associated support strap sections.

Pursuant to an exemplary embodiment of the invention, it is expedient if the support strap sections are formed in the front straps of the loop-shaped support straps, which face the sitting portion.

In a manner known from the prior art of DE 10 2007 019 348 B3, for the application of a pretension into the run of the loop-shaped support straps, at least one tensioning device is provided.

Pursuant to a first exemplary embodiment of the invention, the free ends of each strap loop, which forms a vertical support strap, can be secured to the eyelets of the braces of the support frame, and the vehicle-mounted anchors can be embodied as guide or reversing eyelets. Thus, with this embodiment the run of the two support straps that are respectively disposed in the side regions of the sitting portion, and are embodied as strap loops, correspond to the construction of the strap framework described in DE 10 2007 019 348 B3. Herewith, the tensioning device can be incorporated directly into the run of each support strap loop, preferably respectively into the support strap section that extends between the lower eyelet of the associated brace of the support frame and the vehicle-mounted anchor that is disposed below the sitting portion.

Pursuant to an alternative embodiment of the invention, the run of one of each loop-shaped support strap is modified such that the associated end of the support strap section that extends between the lower eyelet of the associated brace of the support frame and the to anchor disposed below the sitting portion is not secured to the associated eyelet of the brace, but rather is guided through the eyelet, undergoes a change in direction therein, and is guided to a second anchor disposed below the sitting portion, where it is secured. To this extent, with this embodiment the tensioning device can respectively be incorporated into that section of each support strap that extends between the lower eyelet of the braces of the support frame and the second anchor that serves as a securement. On the whole, the securement of each loop-shaped support strap, and the incorporation of the tensioning device therein, is thus simplified, especially since the second anchor at the floor can be disposed at any desired suitable location of the vehicle floor.

Pursuant to another alternative embodiment of the invention, the two vertical support strap sections can be part of a single endless support strap. For this purpose, in the same manner as with the previously described embodiment, provided below the sitting portion are two spaced-apart anchors that are at the floor and that serve for the guiding-through and respective reversal of direction of the one-piece support strap. The guidance of the support strap through the eyelets of the braces of the support frame, and through the vehicle-mounted anchors, is effected in that the one end of the support strap is secured to the upper eyelet of the one brace of the support frame, from there is guided to the anchor disposed above the sitting portion and after reversal of direction is guided to the first anchor of the two anchors disposed below the sitting portion, and after reversal of direction from here is guided to the lower eyelet of the same brace of the support frame and after reversal of direction is guided to the second anchor disposed below the sitting portion, and after reversal of direction is guided to the second anchor associated with the other brace of the support frame and from here is guided via the lower eyelet of the other brace of the support frame to the first anchor disposed below the sitting portion, and after reversal of direction is guided from here to the other anchor associated above the sitting portion, and after reversal of direction is guided back to the upper eyelet of the other brace of the support frame, and is secured thereto.

With this embodiment, the tensioning device can be incorporated into the support strap section that extends between the two anchors that are disposed below the sitting portion and are respectively associated with the braces of the support frame.

Pursuant to one exemplary embodiment of the invention, the support frame can be comprised of the two vertical braces and of at least two crossbars that are disposed at an angle thereto and are connected with the vertical braces. Herewith, the support frame can be made of metal or alternatively from a robust polymeric material.

In addition to its sitting portion, the inventive safety seat can also be provided with a backrest, so that in addition to the sitting portion a backrest can also be secured to the support frame.

BRIEF DESCRIPTION OF THE DRAWINGS

One exemplary embodiment of the invention, which will be described subsequently, is illustrated in the drawing, in which:

FIG. 1 is a schematic illustration showing a strap framework that is provided for the securement of the sitting portion of a safety seat and that has a one-piece support strap and a support frame for the sitting portion incorporated therein, FIG. 2 shows the subject matter of FIG. 1 with the addition of the sitting portion as well as a backrest.

DESCRIPTION OF SPECIFIC EMBODIMENTS

Pursuant to FIG. 1, the reference numeral 10 designates the roof region of a vehicle, and the reference numeral 11 designates the floor region of the vehicle, whereby a belt or strap framework is stretched between the roof region 10 and the floor region 11 for fastening or securing in place a safety seat thereon. In the illustrated embodiment, this strap framework is comprised of a one-piece support or retaining belt or strap 12, in the run of which, which will be described in detail subsequently, is incorporated a support frame 13 of metal or a suitably reinforced polymeric material, whereby the support frame 13 is provided for the securement of at least one sitting portion. The support frame 13 is comprised of two vertically oriented braces 14a and 14b that are connected to one another by means of cross bars 15. The support frame 13 is incorporated in the run of the framework formed by the one-piece support strap 12 in such a way that a vertical orientation of the braces 14a, b, and hence of the support frame 13, results. To attach the support strap 12 to the braces 14a, b, the upper and lower ends of the braces 14a, b are provided with eyelets 16 and 21 respectively.

In the illustrated embodiment, the guidance of the one-piece support strap 12, to form the strap framework that supports the support frame 13, is effected in such a way that one end of the one-piece support strap 12 is secured to the upper eyelet 16 of a vertical brace 14a. From here, a strap section 17 of the support strap 12 extends to an anchor 18 that is disposed above the support frame 13, or above the sitting portion 26 (FIG. 2) carried thereby, and that is secured in the roof region 10 of the vehicle; at this anchor, the strap section undergoes a reversal of direction and is guided to a first anchor 20 that is mounted on the vehicle floor 4211 opposite the other anchor. In so doing, the strap section 17 forms a front strap, and the strap section that extends between the anchors 18 and 20 forms a rear strap 19. The support strap is then guided about the first anchor 20 at the floor, and via a strap section 22 is guided in the direction of the support frame 13, undergoes a reversal of direction in the lower eyelet 21 of the first brace 14a, and is subsequently guided to a second anchor 23 at the floor that is spaced from the first anchor 20 at the floor.

At the second anchor 23, the support strap 12 again undergoes a reversal of direction and via a strap section 24 is guided in the direction of the oppositely disposed brace 14b of the support frame 13, where in a similarly provided second anchor 23 at the floor it undergoes a reversal of direction in the direction of the support frame 13, and via another strap section is guided upwardly to the lower eyelet 21 of the other brace 14b of the support frame 13. After undergoing a change in direction in this eyelet 21, the support strap 12 is again guided back to the associated first anchor 20 on the side of the floor as the belt section 22, where it undergoes a reversal in direction and extends as the associated rear strap 19 up to the associated upper anchor 18. Here, after undergoing a reversal in direction, the support strap, via a corresponding strap section 17, again extends to the upper eyelet 16 of the other brace 14b, with an end of the strap section being secured thereto. In the illustrated embodiment, a tensioning device 25 is incorporated into the strap section 24 that extends between the respective second anchors 23 at the floor; by means of this tensioning device, the one-piece support strap 12 that stretches between the anchors of the vehicle can be placed under a pretension, so that the vertical orientation of the support frame 13 that is incorporated in the run of the support strap 12 is established.

As can be supplementarily seen from FIG. 2, a sitting portion 26 as well as a backrest 27 are secured to the support frame 13.

To the extent that reference is made in the application documents to a vertical extension or a vertical orientation, this also encompasses a deviation of up to about 15 degrees from vertical lines positioned between vehicle roof and vehicle floor, since the vehicle seats in a vehicle are generally positioned in a slightly inclined arrangement.

The features of the subject matter of these documents disclosed in the preceding description, the patent claims, the abstract and the drawing can be important individually as well as in any desired combination with one another for realizing the various embodiments of the invention.

The specification incorporates by reference the disclosure of German 10 2009 040 472.4 filed Sep. 8, 2009, as well as International application PCT/EP2010/005421 filed Sep. 3, 2010.

The present invention is, of course, in no way restricted to the specific disclosure of the specification and drawings, but also encompasses any modifications within the scope of the appended claims.

The invention claimed is:

1. A safety seat for land vehicles, aircraft and watercraft, comprising:
a sitting portion (26);
a strap framework for holding said sitting portion (26) in place, wherein said strap framework comprises vertically extending support straps (12) that are anchored to a vehicle and extend in a region of a rear edge of said sitting portion (26), further wherein said vertically extending support straps (12) are each embodied as a loop that stretches between vehicle-mounted anchors (18, 20) that are vertically spaced from one another above and below said sitting portion (26), and wherein said support strap loops include a front strap and a rear strap; and
a support frame (13) to which said sitting portion is secured, wherein said support frame is provided with two braces (14a, 14b) that are oriented in a direction of extension of said vertically extending support straps (12), further wherein for a securement of said support frame (13) to said strap framework, said front strap or said rear strap of each support strap loop is divided into two support strap sections (17, 22), wherein one (17) of said support strap sections extends between said support frame (13) and one (18) of said vehicle-mounted anchors that is disposed above said sitting portion (26), and the other (22) of said support strap sections extends between said support frame (13) and one (20) of said vehicle-mounted anchors that is disposed below said sitting portion (26), and wherein ends of said support strap sections (70, 22) that are associated with said support frame (13) are retained at said braces (14a, 14b) of said support frame (13) and are configured to hold said support frame (13) under tension in a vertical orientation.

2. A safety seat according to claim 1, wherein ends of said braces (14a, 14b) of said support frame (13) are respectively provided with eyelets (16, 21) for securement thereon of ends of said vertically extending support straps (12) and/or of said associated support strap sections (17, 22).

3. A safety seat according to claim 1, wherein said front straps of said support strap loops face said sitting portion (26), and wherein said support strap sections (17, 22) are formed in said front straps.

4. A safety seat according to claim 1, wherein at least one tensioning device (25) is provided for application of a pretension into a run of said support strap loops.

5. A safety seat according to claim 2, wherein free ends of each of said loops that form a vertically extending support strap (12) are secured to said eyelets (16, 21) of said braces (14a, 14b) of said support frame (13), and wherein said vehicle-mounted anchors (18, 20) are embodied as guide or reversing eyelets.

6. A safety seat according to claim 2, wherein an end of each loop that forms a vertically extending support strap (12) is secured to a respective upper one (16) of said eyelets of said braces (14a, 14b) of said support frame (13), further wherein an adjoining one (17) of said support strap sections is guided via that vehicle-mounted anchor (18) that is disposed above said sitting portion (26) and is embodied as a strap direction-changing device, to a first vehicle-mounted anchor (20) that is disposed below said sitting portion (26) and is embodied as a strap direction-changing device and from there is guided to a lower one (21) of said eyelets of said braces (14a, 14b) of said support frame (13), where said support strap section undergoes a change in direction and is guided to a second vehicle-mounted anchor (23) disposed below said sitting portion (26), where a free end of said support strap section is secured.

7. A safety seat according to claim 2, wherein said two support strap sections (17, 22) for securement of said support frame (13) are part of a single endless substantially vertically extending support strap (12), further wherein below said sitting portion (26), associated with each of said braces (14a, 14b) of said support strap (13) are two space-apart ones of said vehicle-mounted anchors (20, 23) for through-guidance of said support strap (12), further wherein a first end of said support strap (12) is secured to an upper one (16) of said eyelets of one of said braces (14a) of said support frame (13), from where said support strap (12) is guided to said vehicle-mounted anchor (18) that is disposed above said sitting portion (26) and after a change in direction is guided to a first one (20) of said two anchors disposed below said sitting portion (26), and after a further change in direction said support strap (12) is guided to a lower one (21) of said eyelets of said same brace (14a) of said support frame (13) and after a change in direction is guided to a second one of said anchors (23) disposed below said sitting portion (26), and after a further change in direction said support strap (12) is guided to that second anchor (23) associated with the other brace (14b) of said support frame (13) and from here is guided over the lower eyelet (21) of the other brace (14b) of said support frame (13) to the other first anchor (20) disposed below the sitting portion (26), and after a further change of direction said support (12) is guided to the other anchor (18) disposed above the sitting portion (26), and wherein after a further change in direction said support strap (12) is guided back to the upper eyelet (16) of the other brace (14b) of said support frame (13) and is secured thereto.

8. A safety seat according to claim 7, wherein a tensioning device (25) is incorporated into a strap section (24) of said support strap (12) that extends between said two second anchors (23) that are disposed below said sitting portion (26) and are respectively associated with said braces (14a, 14b) of said support frame (13).

9. A safety seat according to claim 1, wherein said support frame (13) is comprised of said two braces (14a, 14b) and of at least two cross bars (15) that are disposed at an angle to said braces (14a, 14b) and are connected to said braces.

10. A safety seat according to claim 9, wherein said support frame (13) is made of metal.

11. A safety seat according to claim 9, wherein said support frame (13) is made of a robust polymeric material.

12. A safety seat according to claim 9, wherein in addition to said sitting portion (26), a backrest (27) is additionally secured to said support frame (13).

* * * * *